US010018185B2

United States Patent
Mohan et al.

(10) Patent No.: US 10,018,185 B2
(45) Date of Patent: Jul. 10, 2018

(54) SYSTEM AND METHOD FOR COMMISSIONING WIND TURBINES

(71) Applicant: GENERAL ELECTRIC COMPANY, Schenectady, NY (US)

(72) Inventors: Sumitha Mohan, Bangalore (IN); Minesh Ashok Shah, Schenectady, NY (US); Rajni Kant Burra, Niskayuna, NY (US); Govardhan Ganireddy, Bangalore (IN); Akshay Krishnamurty Ambekar, Bangalore (IN); Murali Mohan Baggu Data Venkata Satya, Niskayuna, NY (US); Allen Michael Ritter, Salem, VA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 536 days.

(21) Appl. No.: 14/584,275

(22) Filed: Dec. 29, 2014

(65) Prior Publication Data
US 2015/0184642 A1    Jul. 2, 2015

(30) Foreign Application Priority Data

Dec. 30, 2013  (IN) .......................... 6141/CHE/2013

(51) Int. Cl.
*F03D 9/00*    (2016.01)
*F03D 7/00*    (2006.01)
(Continued)

(52) U.S. Cl.
CPC ............ *F03D 11/0091* (2013.01); *F03D 7/00* (2013.01); *F03D 9/257* (2017.02); *F03D 13/30* (2016.05); *F03D 17/00* (2016.05); *Y02E 10/72* (2013.01)

(58) Field of Classification Search
CPC ...... F03D 11/0091; F03D 13/30; F03D 17/00; F03D 7/00; F03D 9/257; Y02E 10/72
See application file for complete search history.

(56) References Cited

U.S. PATENT DOCUMENTS 5,907,192 A    5/1999  Lyons et al.
7,948,103 B2 *  5/2011  Mixter, Jr. .............. F03D 7/047
                                                290/44

(Continued)

FOREIGN PATENT DOCUMENTS

EP    2123909 A2 *  11/2009  ............. F03D 17/00
EP    2662561 A1    11/2013
WO    2011150941 A1  12/2011

OTHER PUBLICATIONS

Sun, "Enhancing wind turbine control by integrating energy storage", Rensselaer Polytechnic Institute, pp. 1-12, May 12, 2012.

(Continued)

*Primary Examiner* — Tulsidas C Patel
*Assistant Examiner* — S. Mikailoff
(74) *Attorney, Agent, or Firm* — Douglas D. Zhang; GE Global Patent Operation

(57) ABSTRACT

A system for commissioning a wind turbine is provided. The system includes a test wind turbine, one or more additional wind turbines coupled to the test wind turbine, and a control system. The control system includes a first control module for controlling the one or more additional wind turbines to act as a power source and provide power to the test wind turbine. The control system also includes a second control module for controlling the one or more additional wind turbines to act as a load for dissipating test power generated by the test wind turbine.

14 Claims, 5 Drawing Sheets

(51) Int. Cl.
*F03D 11/00* (2006.01)
*F03D 17/00* (2016.01)
*F03D 13/30* (2016.01)
*F03D 9/25* (2016.01)

(56) References Cited

U.S. PATENT DOCUMENTS

| | | | |
|---|---|---|---|
| 2007/0138796 A1* | 6/2007 | Hornemann | G01R 31/34 290/44 |
| 2008/0084070 A1* | 4/2008 | Teichmann | H02J 3/38 290/55 |
| 2008/0284172 A1* | 11/2008 | Nielsen | F03D 7/026 290/44 |
| 2010/0133822 A1* | 6/2010 | Mixter, Jr. | F03D 7/047 290/44 |
| 2010/0140939 A1* | 6/2010 | Scholte-Wassink | F03D 7/0224 290/44 |
| 2010/0142237 A1* | 6/2010 | Yuan | H02J 3/386 363/97 |
| 2011/0291416 A1 | 12/2011 | Edenfeld | |
| 2012/0056425 A1 | 3/2012 | Cousineau | |
| 2012/0141267 A1* | 6/2012 | Kang | F03D 7/0224 416/1 |
| 2012/0146423 A1 | 6/2012 | Bodewes et al. | |
| 2012/0261917 A1* | 10/2012 | Egedal | F03D 7/026 290/44 |
| 2013/0154262 A1 | 6/2013 | Tripathi et al. | |
| 2013/0272844 A1* | 10/2013 | Lobato Pena | H02J 3/386 415/1 |
| 2015/0014992 A1* | 1/2015 | Andresen | F03D 7/0284 290/44 |
| 2015/0159627 A1* | 6/2015 | Nielsen | F03D 7/0284 290/44 |
| 2015/0337806 A1* | 11/2015 | Damgaard | F03D 7/047 700/287 |
| 2015/0381089 A1* | 12/2015 | Tarnowski | H02J 3/24 307/84 |
| 2016/0273520 A1* | 9/2016 | Giertz | H02J 3/386 |

OTHER PUBLICATIONS

European Search Report and Opinion issued in connection with corresponding EP Application No. 14198954.1 dated Jun. 9, 2015.

* cited by examiner

SYSTEM AND METHOD FOR COMMISSIONING WIND TURBINES

BACKGROUND

Embodiments of the present invention relate generally to wind turbines and more particularly to a system and method for commissioning wind turbines.

Wind turbines are used to generate electrical power from wind energy. Multiple wind turbines may be coupled together to form a wind farm. Wind farms are typically coupled to power grids. Commissioning of each wind turbine in wind farms is a multi-step procedure. Initially, a pre-commissioning acceptance test is conducted that includes a de-energized inspection of the wind turbine components of the wind turbine. Subsequently, a field commissioning acceptance test is conducted on the wind turbine in which an energized testing of the wind turbine components is performed. In the next step, a converter commissioning test is conducted on the wind turbine in which an energized testing of a power converter is performed. As a last step, the wind turbine is configured to generate power for validating a power curve before the wind turbine is finally coupled to the power grid.

The field commissioning acceptance and converter commissioning test may be conducted by various methods depending on an availability of the power grid. In certain situations, when the power grid is unavailable during the commissioning of the wind turbines, the field commissioning acceptance and the converter commissioning test may be conducted by coupling a diesel generator to the wind turbine. The diesel generator acts a power source and provides power to the wind turbine for the energized testing.

Once the field commissioning acceptance and converter commissioning test is completed, the wind turbine is configured to generate power for validating the power curve. An intelligent load bank is coupled to the wind turbine to dissipate the power generated by the wind turbine for a predetermined period of time during the validation process. Such conventional commissioning procedures include costs for leasing the diesel generator, leasing the intelligent load banks and transportation of the diesel generators and the intelligent load banks to each test wind turbine. These costs lead to higher commissioning expenses. Therefore, there is a need for an improved system and method to address the aforementioned issues.

BRIEF DESCRIPTION OF THE INVENTION

In accordance with one embodiment, a system for commissioning a wind turbine is provided. The system includes at least one test wind turbine, one or more additional wind turbines coupled to the at least one test wind turbine, and a control system. The control system includes a first control module for controlling the one or more additional wind turbines to act as a power source and provide power to the at least one test wind turbine. The control system also includes a second control module for controlling the one or more additional wind turbines to act as a load for dissipating test power generated by the at least one test wind turbine.

In accordance with another embodiment, a method for commissioning a wind turbine is provided. The method includes coupling at least one test wind turbine to one or more additional wind turbines, controlling the one or more additional wind turbines to act as a power source for providing power to the at least one test wind turbine during an earlier stage of commissioning, and controlling the one or more additional wind turbines to act as a load for dissipating test power generated by the at least one test wind turbine during a later stage of commissioning.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Embodiments of the present invention include a system and method for commissioning a wind turbine in a wind farm. The system includes at least one test wind turbine, one or more additional wind turbines coupled to the at least one wind turbine, and a control system. The control system includes a first control module for controlling the one or more additional wind turbines to act as a power source and provide power to the at least one test wind turbine. The control system also includes a second control module for controlling the one or more additional wind turbines to act as a load for dissipating test power generated by the at least one test wind turbine.

Figure 1:
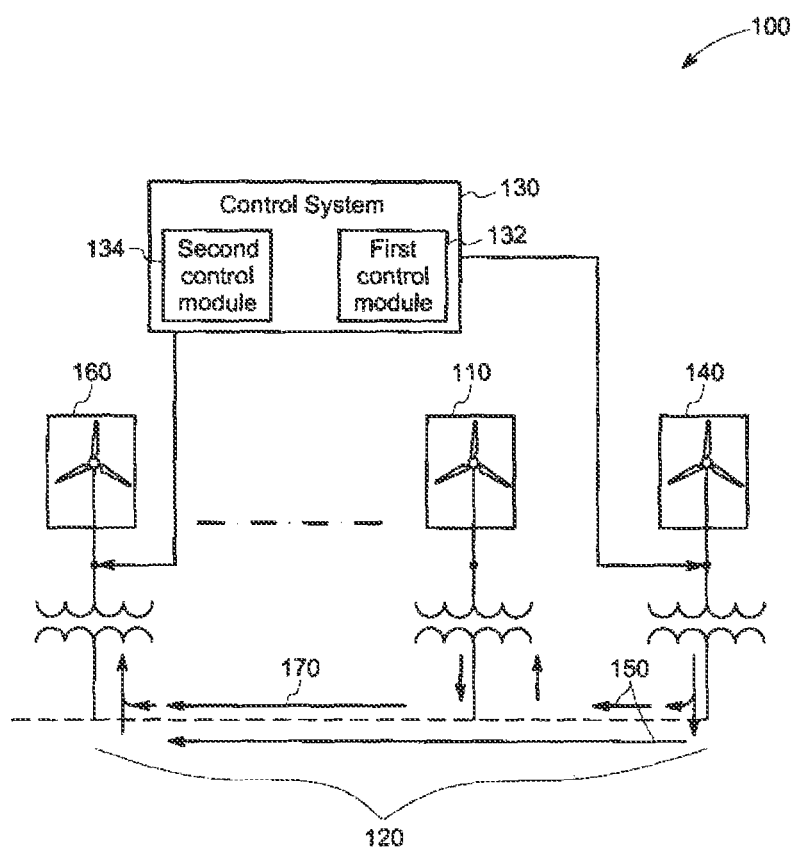
FIG. 1 is a diagrammatic representation of a system for commissioning a wind turbine in accordance with an embodiment of the invention.

FIG. 1 is a diagrammatic representation of a system 100 for commissioning a wind turbine in accordance with an embodiment of the invention. The system 100 includes at least one test wind turbine 110 that is coupled to one or more additional wind turbines 120. The system also includes a control system 130 that includes a first control module 132 and a second control module 134. In one embodiment, the first control module 132 and the second control module 134 are independent of each other and may not communicate with each other. The first control module 132 enables the control system 130 to control a first additional wind turbine 140 to act as a power source for the at least one test wind turbine 110. The first additional wind turbine 140 provides power 150 to the at least one test wind turbine 110 for commissioning in a wind farm (not shown). In the embodiment of FIG. 1, the second control module 134 enables the control system 130 to control a second additional wind turbine 160 to act as a load. The second additional wind turbine 160 behaves as a load and is used to dissipate a test power 170 generated by the at least one test wind turbine 110. In one embodiment, one or more second additional wind turbines 160 may be used to act as the load.

Figure 2:
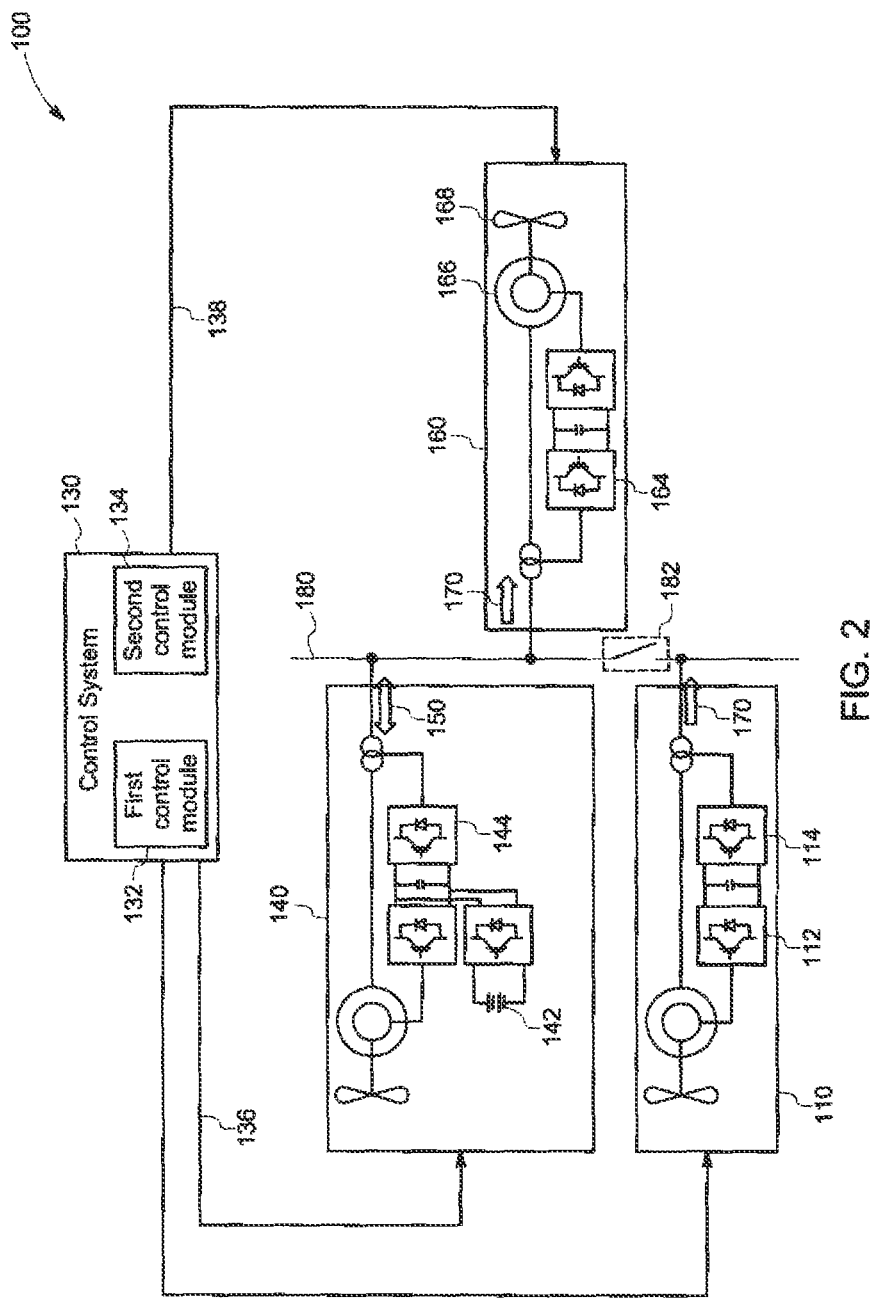
FIG. 2 is a detailed schematic representation of a system for commissioning a wind turbine in accordance with an embodiment of the invention.

FIG. 2 is a detailed schematic representation of the system 100 for commissioning the at least one test wind turbine 110 in accordance with an embodiment of the invention. In one embodiment, the system 100 for commissioning the at least one test wind turbine 110 is employed in situations where a power grid (not shown) is unavailable. Initially, the first additional wind turbine 140 and the second additional wind turbine 160 may be commissioned using a conventional method such as using a diesel generator as a power source and an intelligent load bank as the load. Subsequently, the first additional wind turbine 140 and the second additional wind turbine 160 are controlled to operate as the power source and the load for the at least one test wind turbine 110. The diesel generator and the intelligent load bank are not required further for commissioning the at least one test wind turbine 110. In one embodiment, one or more test wind turbines 110 may be commissioned sequentially or simultaneously based on power ratings of the test wind turbine 110, the first wind turbine 140, and the second wind turbine 160.

For ease of illustration, an embodiment including commissioning of one test wind turbine 110 is described below. In operation, a pre-commissioning acceptance test is performed by visually inspecting wind turbine components of the test wind turbine. The test wind turbine 110 is subsequently electrically coupled to the first additional wind turbine 140 and the second additional wind turbine 160. In one embodiment, the test wind turbine 110, the first additional wind turbine 140, and the second additional wind turbine 160 are coupled to a common feeder 180. In other embodiments, the wind farm may include multiple feeders, and the test wind turbine 110 may be coupled to a feeder that is different from the feeder of the first additional wind turbine 140 and the additional second wind turbine 160. In such embodiments, a feeder circuit breaker 182 may be used to couple the first additional wind turbine 140, the second additional wind turbine 160, and the test wind turbine 110.

The control system 130 is further coupled to the first additional wind turbine 140 and the second additional wind turbine 160. The first control module 132 enables the control system 130 to control the first additional wind turbine 140 to act as the power source. In one embodiment, the first additional wind turbine 140 acts as a voltage source. The first control signal 136 also controls the first line side converter 144 to receive power 150 from the integrated energy storage element 142 and act as the voltage source. The test wind turbine 110 and the second additional wind turbine 160 then draw power 150 from the voltage source and energize the respective wind turbine components in the test wind turbine 110 and the second additional wind turbine 160. In embodiments wherein a nominal wind speed is available, the first additional wind turbine 140 may start generating power 150, and the first line side converter 144 may receive power 150 solely from the first additional wind turbine 140 and not from the integrated energy storage element 142. In embodiments wherein additional power is required, supplemental power may be drawn from the integrated storage element 142 of wind turbine 140. Specifically, the first line side converter 144 receives the power 150 from the first additional wind turbine 140 and uses the power 150 to energize the wind turbine components (not shown) of the test wind turbine 110 and the second additional wind turbine 160.

A field commissioning acceptance test is performed with energized wind turbine components of the test wind turbine 110 using the power 150 from the voltage source. In one embodiment, the field commissioning acceptance test is performed while energizing a pitch motor, a yaw motor, and a rotor of the test wind turbine 110. Furthermore, once the test wind turbine 110 passes the field commissioning acceptance test, a converter commissioning test is performed in the test wind turbine 110. The converter commissioning test is performed to examine a rotor side power converter 112 and the line side power converter 114 of the test wind turbine 110. In one embodiment, the converter commissioning test may include a de-energized inspection of the line side converter 114 and the rotor side converter 112, validating a communication link and a software operation of the rotor side converter 112 and the line side converter 114, and performing a cell test for the rotor side converter 112 and the line side converter 114.

Upon successful completion of the converter commissioning test, the test wind turbine 110 is required to validate a power curve. The validation of the power curve is performed by operating the test wind turbine 110 for a predefined period of time. In one embodiment, the predefined period of time may include six hours. The test wind turbine 110 generates test power 170 for the predefined period of time, and the test power 170 is tracked based on the power curve.

During validation of the power curve, the test power 170 generated by the test wind turbine 110 is required to be dissipated by some means. In the embodiment of FIG. 2, the second additional wind turbine 160 is used to act as the load through which the test power 170 is dissipated. The control system 130 includes the second control module 134 that generates a second control signal 138 for controlling the second additional wind turbine 134 to act as the load. In one embodiment, the second additional wind turbine 160 draws power 150 from the first additional wind turbine 140 to energize the respective wind turbine components. For example, the wind turbine components may include a pitch motor and a yaw motor of the second additional wind turbine 160. The second control signal 138 controls a second line side converter 164 to operate as a current source for the second additional wind turbine 160. The wind turbine components (not shown) of the second additional wind turbine 160 receive power 150 from the second line side converter 164 and initiate respective operations. Furthermore, the test power 170 generated by the test wind turbine 110 is transmitted to the second additional wind turbine 160. In embodiments, where the second additional wind turbine 160 includes an integrated energy storage element (not shown), the second control module 134 receives a charge status of the integrated energy storage element. If the integrated energy storage element is partially discharged, the second line side converter 164 transmits the test power 170 to the integrated energy storage element prior to transmitting the test power 170 to a rotor 166.

The rotor 166 receives the test power 170 from the second line side converter 164 and starts rotating wind turbine blades 168 of the second additional wind turbine 160. In one embodiment, to dissipate the test power 170, a pitch motor (not shown) of the second additional wind turbine 160 is controlled by the second control module 134 to adjust a pitch angle of the wind turbine blades 168. The pitch angles are adjusted such that the wind turbine blades 168 generate a negative torque. In one embodiment, the pitch angles are computed based on the test power 170 and wind speed at the second additional wind turbine 160. The second control module 134 controls the pitch angles at a value above a nominal value to generate negative torque in the second additional wind turbine 160. Therefore, by generating the negative torque, the second additional wind turbine 160 is able to dissipate the test power 170 generated by the test wind turbine 110. Once the power curve is validated, commissioning of the test wind turbine 110 is completed and the above mentioned process is repeated with another test wind turbine.

Figure 3:
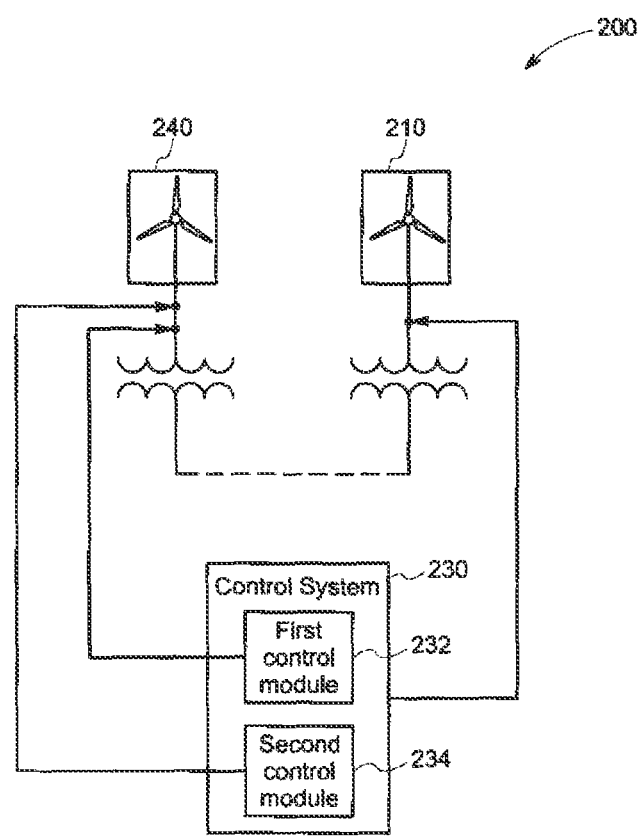
FIG. 3 is a diagrammatic representation an alternative embodiment of a system for commissioning a wind turbine in accordance with an embodiment of the invention.

FIG. 3 is a diagrammatic representation an alternative embodiment of a system 200 for commissioning a test wind turbine 210 in accordance with an embodiment of the invention. In this embodiment, a first additional wind turbine 240 is coupled to the test wind turbine 210. The first additional wind turbine 240 acts both as a power source and as a load for the test wind turbine 210. Initially, the first additional wind turbine 240 is commissioned in a wind farm (not shown) using conventional methods. Once the first additional wind turbine 240 is commissioned on the wind farm, the test wind turbine 210 is coupled to the first additional wind turbine 240. The system 200 includes a control system 230 coupled to the first additional wind turbine 240 and the test wind turbine 210. The control system 230 includes first control module 232 and a second control module 234 that control the first additional wind turbine 240 to act as the power source and the load respectively.

Figure 4:
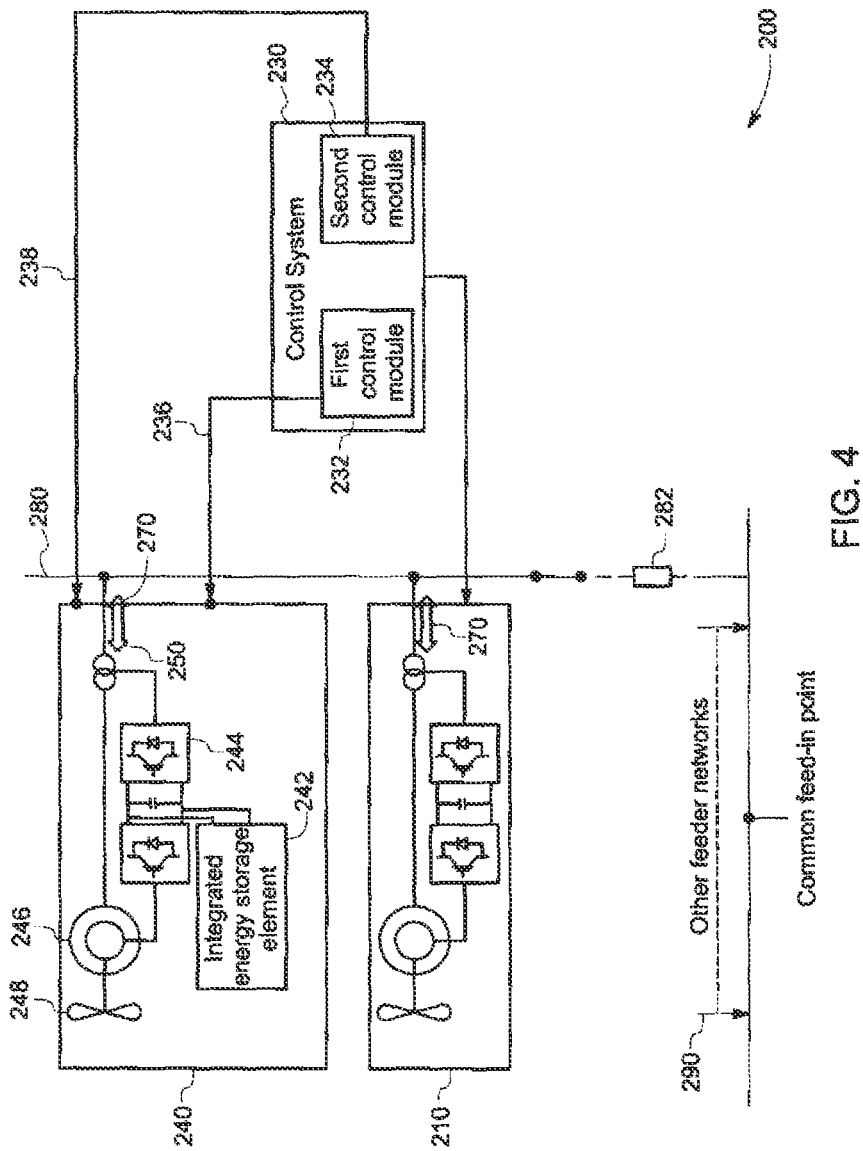
FIG. 4 is a detailed schematic representation of an alternative embodiment of a system for commissioning a wind turbine in accordance with an embodiment of the invention.

FIG. 4 is a detailed schematic representation of the alternative embodiment of the system 200 for commissioning the test wind turbine 210 in accordance with an embodiment of the invention. The first additional wind turbine 240 includes an integrated energy storage element 242 which is controlled by the control system 230 to provide power 250 to the test wind turbine 210. The control system 230 includes the first control module 232 that generates a first control signal 236. The first control signal 236 also enables a first line side converter 244 to receive power 250 from the integrated energy storage element 242 and operate as a voltage source. The test wind turbine 210 draws power 250 from the voltage source for the energized inspection of the wind turbine components (not shown) during the field commissioning acceptance test and the converter commissioning test.

Subsequently, after completion of the aforementioned tests, the control system 230 initiates a second control module 234. The second control module 234 modifies the controls of the first line side converter 244 to receive test power 270 from the test wind turbine 210. The test wind turbine 210 generates the test power 270 during the validation of the power curve and the test power 270 is transmitted to the first line side converter 244. The first line side converter 244 uses the test power 270 to operate the first additional wind turbine 240. If desired, the first line side converter 244 may also be controlled to provide the test power 270 to the integrated energy storage element 242. In cases where the integrated energy storage element is fully charged, the first line side converter 244 provides the test power 270 to a wind turbine generator 246 which in turn rotates wind turbine blades 248 of the first additional wind turbine 240. The wind turbine blades 248 dissipate the test power 270 received from the test wind turbine 210. The wind turbine blades 248 are operated such that the wind turbine blades 248 generate negative torque that leads to dissipation of the test power 270. The negative torque in the first additional wind turbine 240 is achieved by operating the wind turbines blades 248 at pitch angles above a nominal pitch angle. The nominal pitch angle is computed based on wind speed and wind direction at the first additional wind turbine 240. A negative torque pitch angle is computed based on the nominal pitch angle, the wind speed, the test power 270 and a load bearing capability of the first additional wind turbine 240. The negative torque pitch angle is kept within a specific range such that loads at the first additional wind turbine 240 never exceed a maximum load bearing capability of the first additional wind turbine 240.

If desired, upon completion of the validation of the power curve, the first additional wind turbine 240 may be coupled to another test wind turbine and the process is repeated for commissioning another test wind turbine. Similarly, the first additional wind turbine 240 can be used for commissioning test wind turbines 210 at different feeders 290 in the wind farm. The first additional wind turbine 240 may be coupled to the test wind turbine 210 on a different feeder 290 using a feeder circuit breaker 282. The feeder circuit breaker 282 is used to couple different feeders 290 together to form a common feeder 280.

Figure 5:
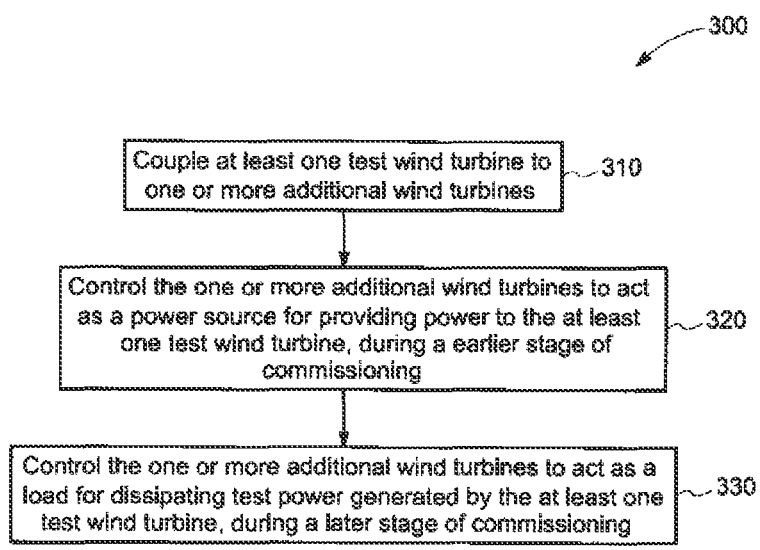
FIG. 5 is a flow chart representing steps involved in a method for commissioning a wind turbine in accordance with an embodiment of the invention.

FIG. 5 is a flow chart representing steps involved in a method 300 for commissioning a wind turbine in accordance with an embodiment of the invention. In one embodiment, commissioning the wind turbine further includes sequentially performing a pre-commissioning test, a field commissioning test, a converter commissioning test, and validation of a power curve. The method 300 includes coupling at least one test wind turbine to one or more additional wind turbines in step 310. The method 300 also includes controlling the one or more additional wind turbines to act as a power source for providing power to the at least one test wind turbine, during an earlier stage of commissioning in step 320. In one embodiment, the one or more additional wind turbines are controlled to act as the power source during a field commissioning acceptance test and a converter commissioning acceptance test. In a specific embodiment, an integrated energy storage element in the one or more additional wind turbines is controlled to provide power to the at least one test wind turbine. In addition or as an alternative embodiment, a line side converter may be controlled to operate as a voltage source for providing power to the at least one test wind turbine. The method 300 further includes controlling the one or more additional wind turbines to act as a load for dissipating test power generated by the at least one test wind turbine, during a later stage of commissioning in step 330. During this later stage of commissioning, the one or more additional wind turbines are controlled to act as the load during validation of a power curve. In a specific embodiment, the one or more additional wind turbines are controlled to generate a negative torque to act as the load during the later stage of commissioning. In a more specific embodiment, the negative torque is generated by controlling a pitch angle of the one or more wind turbine blades of the one or more additional wind turbines. In an exemplary embodiment, a first additional wind turbine is controlled to act as the power source and a second additional wind turbine is controlled to act as the load. In another embodiment, a first additional wind turbine is controlled to act as the power source and the load.

It is to be understood that a skilled artisan will recognize the interchangeability of various features from different embodiments and that the various features described, as well as other known equivalents for each feature, may be mixed and matched by one of ordinary skill in this art to construct additional systems and techniques in accordance with principles of this disclosure. It is, therefore, to be understood that the appended claims are intended to cover all such modifications and changes as fall within the true spirit of the invention.

Embodiments of the present invention help in commissioning of wind turbines in a wind farm where, a power grid is unavailable for commissioning of the wind turbines. The present invention reduces a cost of commissioning the wind turbines as it eliminates the use of power generators and intelligent load banks for commissioning the wind turbines in the wind farms. Moreover, the present invention reduces a time for commissioning the wind turbines. The present invention eliminates a need for transportation of the power generators and intelligent load banks to different wind turbine locations leading to reduction in time for commissioning.

While only certain features of the invention have been illustrated and described herein, many modifications and changes will occur to those skilled in the art. It is, therefore, to be understood that the appended claims are intended to cover all such modifications and changes as fall within the true spirit of the invention.

What we claim is:

1. A system for commissioning at least one test wind turbine, the system comprising:
    one or more additional wind turbines coupled to the at least one test wind turbine; and
    a control system operatively coupled to the at least one test wind turbine and the one or more additional wind turbines, wherein the control system is configured to:
        control the one or more additional wind turbines to act as a power source and provide power to the at least one test wind turbine; and
        control the one or more additional wind turbines to act as a load for dissipating test power generated by the at least one test wind turbine,
    wherein the one or more additional wind turbines provide power to the at least one test wind turbine during a field commissioning acceptance test, wherein the field commissioning acceptance test comprises an energized testing of one or more components of the at least one test wind turbine.

2. The system of claim 1, wherein a wind turbine of the one or more additional wind turbines comprises an integrated energy storage element.

3. The system of claim 2, wherein the integrated energy storage element provides power to the at least one test wind turbine.

4. The system of claim 1, wherein the one or more additional wind turbines act as the load during a validation of a power curve.

5. The system of claim 1, wherein the control system is configured to control exactly one of the one or more additional wind turbines to act both as the power source and the load.

6. The system of claim 1, wherein the one or more additional wind turbines comprise a line side power converter, and wherein the line side power converter is configured to supply a voltage to the at least one test wind turbine.

7. The system of claim 1, wherein the one or more additional wind turbines and the at least one test wind turbine are coupled to a common feeder.

8. A method for commissioning at least one test wind turbine, the method comprising:
    coupling the at least one test wind turbine to one or more additional wind turbines;
    controlling the one or more additional wind turbines to act as a power source for providing power to the at least one test wind turbine, during an earlier stage of commissioning;
    controlling the one or more additional wind turbines to act as a load for dissipating test power generated by the at least one test wind turbine, during a later stage of commissioning; and
    performing a field commissioning acceptance test, wherein performing the field commissioning acceptance test comprises performing an energized testing of one or more components of the at least one test wind turbine.

9. The method of claim 8, further comprising performing a validation of a power curve.

10. The method of claim 9, wherein controlling the one or more additional wind turbines to act as the power source for providing power comprises controlling the one or more additional wind turbines to act as the power source during the field commissioning acceptance test.

11. The method of claim 8, wherein controlling the one or more additional wind turbines to act as the power source for providing power comprises controlling an integrated energy storage element in the one or more additional wind turbines to provide power to the at least one test wind turbine.

12. The method of claim 11, further comprising controlling a line side converter of the one or more additional wind turbines to provide a voltage to the at least one test wind turbine.

13. The method of claim 9, wherein controlling the one or more additional wind turbines to act as the load comprises controlling the one or more additional wind turbines to act as the load during the validation of the power curve.

14. The method of claim 8, wherein controlling the one or more additional wind turbines comprises controlling exactly one of the one or more additional wind turbines to act both as the power source and the load.

* * * * *